(12) United States Patent
Diehl et al.

(10) Patent No.: US 6,762,690 B1
(45) Date of Patent: Jul. 13, 2004

(54) METHOD AND APPARATUS FOR OPTIMIZING THE RESOURCE SHARING FOR AUDIO/VIDEO/DATA PROCESSING DEVICES IN A HOME NETWORK ENVIRONMENT

(75) Inventors: Eric Diehl, Liffré (FR); Joel Sirot, Melesse (FR)

(73) Assignee: Thomson Licensing S.A., Boulogne-Billancourt (FR)

( * ) Notice: Subject to any disclaimer, the term of this patent is extended or adjusted under 35 U.S.C. 154(b) by 0 days.

(21) Appl. No.: 09/277,296

(22) Filed: Mar. 26, 1999

(30) Foreign Application Priority Data

Apr. 8, 1998 (EP) ............................................. 98400850

(51) Int. Cl.[7] ......................... G05B 19/02; G05B 23/02; H04Q 1/00
(52) U.S. Cl. .......................... 340/825.25; 340/825.24; 340/825.29; 340/3.1
(58) Field of Search ....................... 340/825.25, 825.24, 340/825.29, 825.22, 3.1, 3.5, 825.52; 725/78, 80; 709/200, 220; 700/3

(56) References Cited

U.S. PATENT DOCUMENTS

| | | | | |
|---|---|---|---|---|
| 5,142,277 A | * | 8/1992 | Yarberry et al. | 340/825.57 |
| 5,161,151 A | * | 11/1992 | Kimura et al. | 370/13 |
| 5,351,041 A | * | 9/1994 | Ikata et al. | 340/825.24 |
| 5,691,980 A | * | 11/1997 | Welles, II et al. | 370/316 |
| 6,023,507 A | * | 2/2000 | Wookey | 380/21 |

FOREIGN PATENT DOCUMENTS

EP  0457673 A  11/1991  ........... H04L/12/28

OTHER PUBLICATIONS

Bloks R.H.J. "The IEEE–1394 High Speed Serial Bus", Philips Journal of Research, vol. 50, no 1/02, Jul. 1996, pp. 209–216, XP000627671.
Copy of European Search Report citing the above–listed documents AM and AR.

* cited by examiner

*Primary Examiner*—Brian Zimmerman
*Assistant Examiner*—Nam Nguyen
(74) *Attorney, Agent, or Firm*—Joseph S. Tripoli; Paul P. Kiel

(57) ABSTRACT

A method/apparatus for sharing a resource of plural video/audio/data signal receivers broadcast by an emitter among a plurality of video/audio/data processing Set Top Units using a Master/Slave protocol. The first STU connected to a receiver is the Master, which has priority over a later-connected slave. An STU has access to all services if there is a free receiver. In the absence of free receivers, an STU can access all the services currently accessed by the other STUs, and the services on the transport streams carrying the services currently viewed by the other STUs. A resource sharing apparatus comprises a dedicated for each STU for displaying resources available to the corresponding STU. The controller indicates Slave status for resources that can be provided for the corresponding STU and a special indication for resource that is currently used by a corresponding STU.

16 Claims, 7 Drawing Sheets

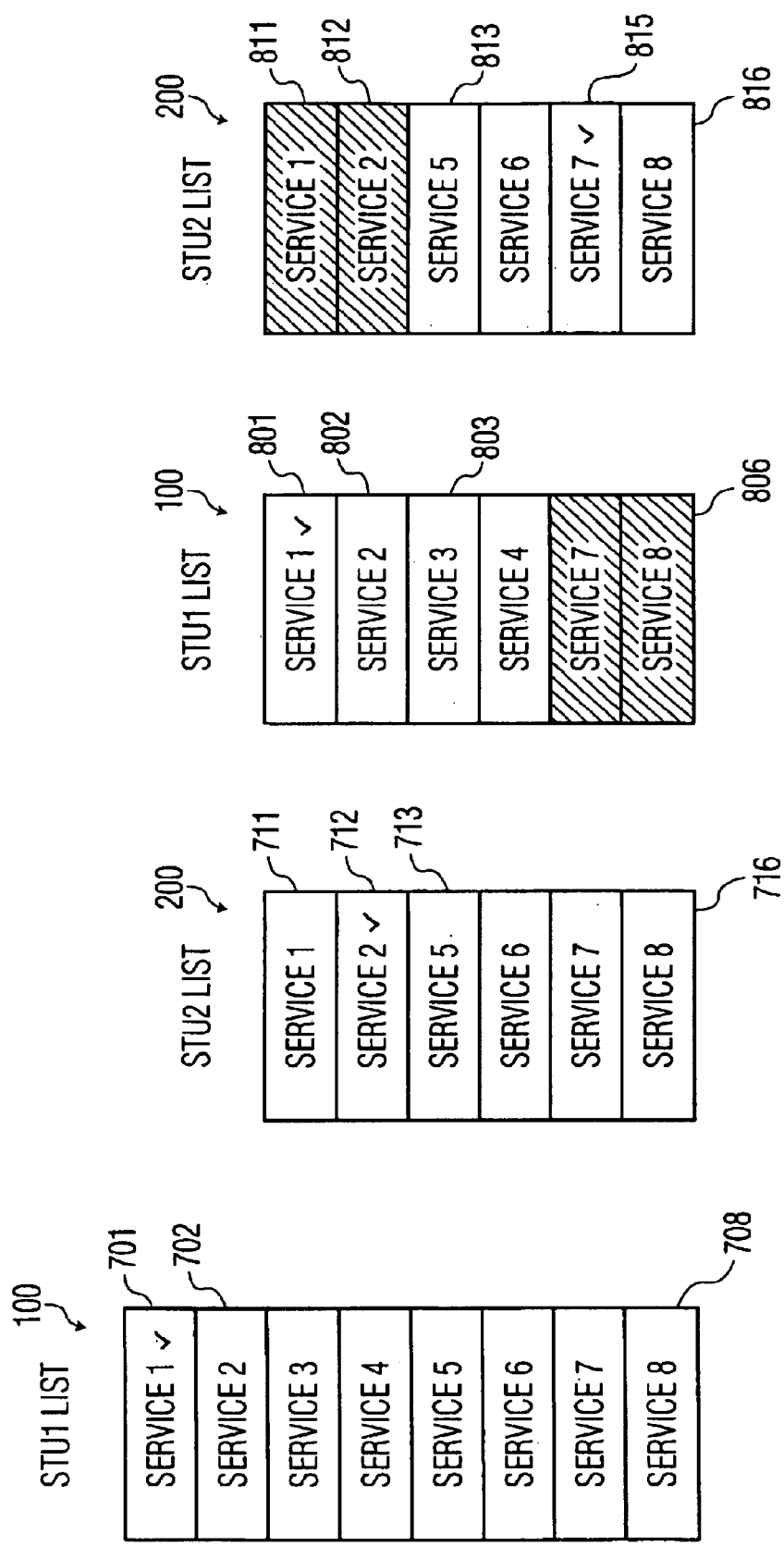

METHOD AND APPARATUS FOR OPTIMIZING THE RESOURCE SHARING FOR AUDIO/VIDEO/DATA PROCESSING DEVICES IN A HOME NETWORK ENVIRONMENT

FIELD OF THE INVENTION

The present invention relates to a home network and more particularly to a method and an apparatus for optimizing the resource sharing for audio, video and data processing devices in a home network environment. This home network may comprise a plurality of set top units, data processing units, video and audio devices, and more particularly digital video processing devices.

BACKGROUND OF THE INVENTION

The environment from which the present invention is derived is the digital video broadcasting (DVB) a detailed specification of which is given in the Standards. One may refer for instance to the European Telecommunication Standards Institute (ETSI) relating to the Digital Video Broadcasting published in EN 300 468-v1.3.1 (1997–09). Any other digital video broadcasting specification may be used.

In order to have an example of a home network implementation, one may refer to a U.S. Pat. No. 5,172,109, where <<a method for registering a unit in a home network at least one part of which is constituted from an open channel>> is disclosed. In that patent, a home automation network comprises open channels wherein various units are linked to the network. These units are for instance domestic electrical equipment, audio, video equipment etc. This particular environment can also be used with the present invention.

However, in the present case, we will consider only the domestic appliances that relate to the multimedia equipment that combines the video, audio and/or data transmissions. This equipment uses more specifically the digital video broadcast (DVB) specifications, their protocols and standards.

According to these requirements, when a DVB receiver tunes a DVB service, it physically tunes a given transponder which carries many DVB services in a multiple Program Transport Stream (MPTS). The associated demultiplexer extracts, through its digital filters the different sections relating to the expected services. Afterwards, the DVB receiver builds from these different sections a Single Program Transport Stream (SPTS) and broadcasts it onto the home network.

Therefore, the problem is to determine the number of DVB receivers, also called receiving means, according to the number of processing units, also commonly called Set Top Units (STUs), that are connected in the home network. A possible solution would be to use as many source devices as there are viewing devices. The source devices and the viewing devices are for instance respectively the DVB receivers and the STUs as previously quoted. In a particular implementation, the STUs are for instance the television sets with MPEG2 decoding capabilities or any other electrical devices that use the video, audio or data transmission.

In the prior art, the home networks often have a basic configuration in which to each set top unit (STU) corresponds a DVB receiver. The reason of this basic configuration is that if a STU needs to view a service other than the one <<tuned>> by a DVB receiver, an additional DVB receiver is required. This configuration implies that there is no sharing of the DVB receivers among the STUs. Therefore, one must acknowledge that this kind of configuration is very expensive and the consumers are certainly not willing to spend so much to settle this home network configuration.

Consequently, it would be preferable to share the source devices or the also called DVB receivers among all the STUs that are connected to the home network and to optimize this resource sharing. In all the description that follows, a video/audio/data processing unit may be represented by a STU.

SUMMARY OF THE INVENTION

It is a primary object of the invention to reduce the number of receiving means by avoiding implementing in a digital home network as many receiving means (or source devices) as there are video/audio/data processing units such as Set Top Units.

It is also an object of the invention to optimise the resource sharing of the receiving means among a plurality of video/audio/data processing units such as Set Top Units.

It is another object of the invention to allot a priority to a specific processing unit in the home network.

It is further object of the invention to control and to track the services tuned by a specific processing unit.

According to the present invention, the services can be shared by a plurality of video/audio/data processing units connected to the home network with respect to a Master/Slave protocol. A processing unit such as a STU may have access, with some constraints, to services that are offered to the principal (or Master) processing unit or STU on the same transport stream.

The principle of sharing the resource is based on the Master/Slave protocol according to which the priority is given to the Master processing unit over the Slave processing unit. The first processing unit or STU that is connected to a receiving unit or a DVB receiver becomes the Master of this DVB receiver.

The resource sharing complies to the two following principles:

As long as there is an available receiving means, a processing unit will have access to all the services accessible by this receiving means;

If there are no more receiving means left, a processing unit may have access to all the services currently viewed by the other processing units and more specifically to all the services offered on the transponder that comprises the services currently viewed by said other processing units.

Thus, according to the present invention, a method for optimizing the resource sharing between set top units in a home network comprising at least one emitter for broadcasting video/audio/data signals, a plurality of means for receiving the signals comprises the steps of:

(a) assigning to each processing Unit connecting to the home network, one of the plurality of receiving means providing requested resource that is available, by conferring to each processing Unit a status of Master processing Unit;

(b) assigning to each newly connected processing Unit one of said plurality of receiving means providing requested resource that is available by conferring a status of Slave processing Units, when no receiving means providing requested service is available; and (c) sharing the resource between Master STUs and Slave STUs in the home network so as to provide access to the requested resource for the Slave STUs.

Conversely, the method according to the present invention may be implemented in an apparatus that comprises means for assigning to each Set Top Unit connecting to the home network, one of the plurality of receiving means providing requested resource that is available by conferring to each processing Unit a status of Master processing Unit;

means for assigning to each newly connected processing Unit one of said plurality of receiving means providing requested resource and for conferring a status of Slave processing Unit, when no receiving means providing requested resource is available; and means for sharing the resource between Master processing units and Slave processing units in the home network so as to provide access to the requested resource for the Slave processing units.

Furthermore, in a particular implementation, the apparatus comprises control means dedicated for each processing unit for displaying resource that is available for the corresponding processing unit wherein the control means contains:

an indication of Slave status for resource that can be provided for the corresponding processing unit; and a special indication for resource that is currently used by a corresponding processing unit.

BRIEF DESCRIPTION OF THE DRAWINGS

FIGS. 7A and 7B illustrate the contents of the STUs' seamless lists when a second STU is connecting to the currently used transponder of the receiver.

FIGS. 8A and 8B illustrate the content of both STUs' seamless lists when different transponders are currently be used.

DESCRIPTION OF THE PREFERRED EMBODIMENTS

The present invention will be described in the environment of a digital video broadcasting system, be that a satellite, terrestrial or cable system. It will be readily be appreciated that its use is not limited to this environment.

Furthermore, it should be kept in mind that in the present description, the Set Top Unit is considered as being for instance a television set or any other communication device that receives digital information from the network and that is capable of retrieving it on a display means. A DVB receiver contains its own tuner for receiving signals by terrestrial, cable or satellite emitters so as to demultiplexe the signals stream to transmit them onto the network to a selected Set Top Unit. Any other device may replace this equipment as long as it performs the functions that are described in the following paragraphs.

Figure 1:
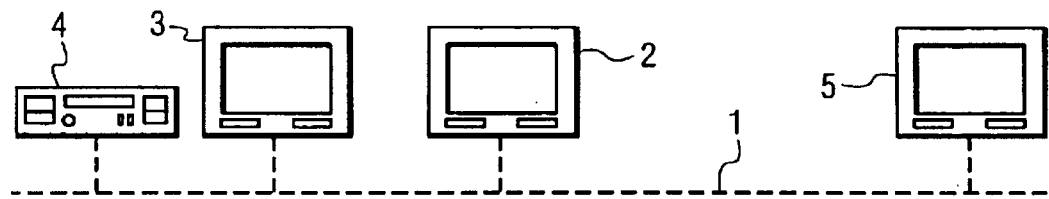
FIG. 1 illustrates an example of a usual home network configuration wherein a plurality of set top units are connected to a DVB receiver.

FIG. 1 illustrates an example of a home network configuration wherein a plurality of set top units are connected to a plurality of DVB receivers. In this particular case, a home network bus (1) is connected to different devices such as television sets (2,3,5) that represent the set top units and a DVB receiver (4) that represents a Gateway. This home network bus (1) is a bidirectional bus that carries data, video and audio signals so as to transmit them to the corresponding devices under the control of a network manager which can be any device of the home network.

A digital network, such as the one recommended in the IEEE 1394 standards, allows to carry MPEG2 streams between domestic devices. In this kind of digital network, there are mainly two types of devices: the source devices and the viewing devices.

1. The source devices receive broadcasted signals and generate partial MPEG2 streams and send them over the home network. The two main categories are DVB receivers and Digital Storage:

DVB receivers, also called residential Gateways in the Digital Home Network (DHN) terminology, receive the broadcast signals from satellites, terrestrial or cable emitters; they demultiplex partly the stream to select the expected services and rebroadcast the services in a stream on IEEE 1394 bus, Digital Storage operates as a local broadcaster since it plays back memorised DVB compliant MPEG services, such event can be played independently from the real time broadcast thanks to a DVD player for instance.

2. The viewing devices receive the partial stream mentioned above. Likewise, the viewing devices can be divided in two categories: set top units and digital storage.

Set Top Units (STU) are MPEG2 units that receive the partial stream carried on the home network, decode it, and finally display the full video on an associated TV set. The STU may be part of the TV set or an external box, Digital Storage operates as a recorder since it memorises services received from the IEEE 1394 network.

A possible solution would be to implement as many source devices as there are viewing devices. As previously mentioned, this expensive solution may not be adapted to the consumer environment. Thus, it is mandatory to share the source devices. The following section describes a way to optimise the sharing.

Figure 2:
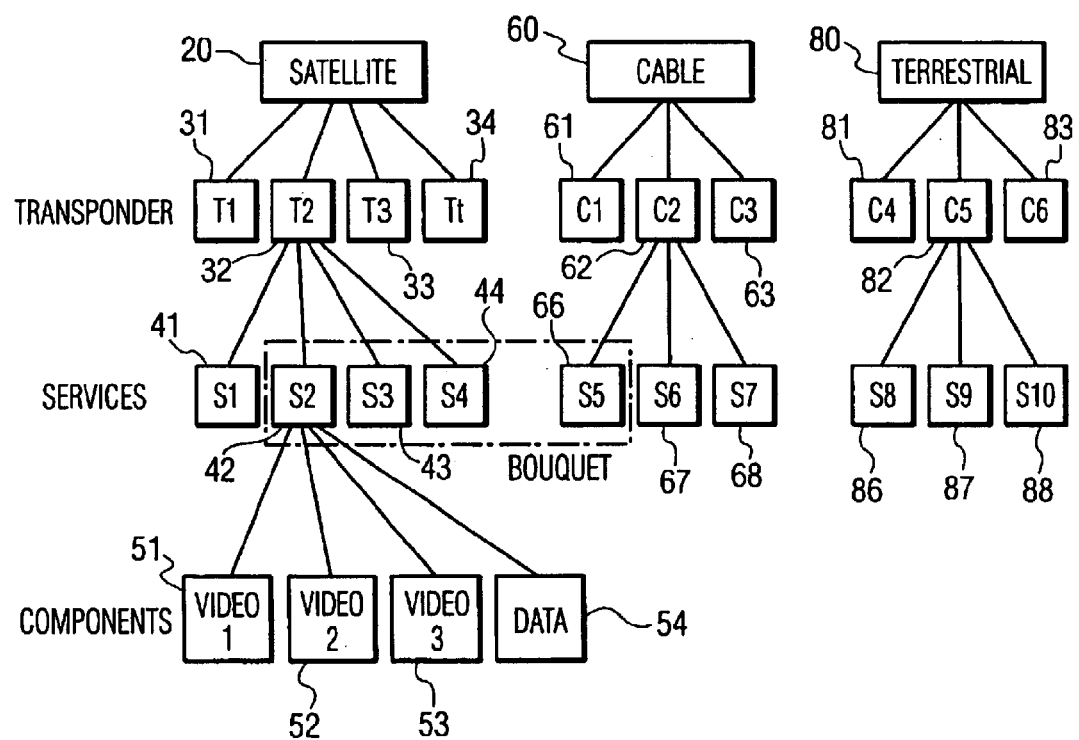
FIG. 2 illustrates an example of the structure of the digital broadcasting and service delivery.

FIG. 2 illustrates an example of the structure of the digital broadcasting and service delivery. It shows the organization of the different parts that are involved in the transmission and reception of the signals from a satellite emitter (20), a cable emitter (60) and a terrestrial emitter (80) to the domestic components, e.g. audio/video/data devices. The meaning of the terminology in this FIG. 2 is used throughout the description that follows.

The satellite, cable and terrestrial emitters broadcast respectively signals to a plurality of DVB receivers. The signals received from the satellite (20) are multiplexed in a plurality of transponders T1 (31), T2 (32), T3 (33) and TT (34). Afterwards, each transponder broadcasts its corresponding services. For instance, transponder T2 (32) broadcasts Service S1 (41), Service S2 (42), Service S3 (43) and Service S4 (44) to all subscribers' home networks that are allowed to connect to transponder T2. At the components level, one may consider that home networks comprise a plurality of DVB receivers such as Video1 (51), Video2 (52) and Video3 (53), and also a data processing device (54). All of these components receive the video/audio and data signals of the corresponding services which is in the present case Service S2 (42).

Conversely, the cable and terrestrial emitters (60,80) respectively broadcast different signals that are received and multiplexed in the corresponding channels (C1, C2, C3) and (C4, C5, C6). Each channel carries a plurality of services like each transponder. For instance, channel C2 (62), likewise channel C1 (61) and channel C3 (63), which is dedicated to the cable transmission, carries Service S5 (66), Service S6 (67) and Service S7 (68).

Some of the services that are provided by the satellite and the cable emitters or any other emitters may be gathered in a transport stream. For instance, a bouquet that is shown in FIG. 2 provides Service S2 (42), Service S3 (43), Service S4 (44) of transponder T2 (32) of the satellite emitter (20) and Service S5 (66) of channel C2 of the cable emitter (60). Thus, a subscriber of this Bouquet is entitled to watch any one the services provided by this bouquet. And the terminology of transponder can be replaced by the terms <<transport stream>> or <<bouquet>>.

The terrestrial broadcasting system is similar to the cable's one. The terrestrial emitter (80) broadcasts different channels, e.g. channel C4 (81), channel C5 (82) and channel C6 (83). Each channel includes a plurality of services. For instance channel C5 (82) broadcasts Service S8 (86), Service S9 (87) and Service S10 (88).

It should be kept in mind that the present description may be implemented in another environment wherein the bouquet may gather any other type of services such as radio or any other kind of information services generated by the terrestrial, satellite or cable emitters as well. The principle is that a bouquet gathers a plurality of services that are provided to the subscribers. Therefore, a bouquet is composed of a combination of any one of the previously mentioned services.

When a DVB receiver, also called Gateway "tunes" a DVB service, it physically tunes a given transponder. The stream of this transponder carries many DVB services. It is a Multiple Program Transport Stream (MPTS). The demultiplexer extracts, through its digital filters, the different sections related to the expected service. Afterwards, the Gateway builds a Single Program Transport Stream (SPTS) and broadcasts it onto the home network.

In the prior art, the simplest way is to assign a receiver to a given STU. If another STU needs to view a service other than the service "tuned" by this receiver, it has to use another DVB receiver. This method requires the <<one to one relationship>> between sources of receivers and viewers of set top units. If all the receivers are already used, an additional STU can only have access to services of receivers currently viewed by the connected STUs. The services which are not currently viewed cannot be accessed though they are on the same transponder corresponding to the services requested by the viewers.

Therefore, according to the present invention, there is desire to increase the services offer despite the limited number of DVB receivers. For that purpose, a STU may also have access, with some limitations, to services that belong to the same transport stream as the ones of the principal viewer or the Master set top unit.

The basic principles are:

As long as there is an available receiver, a STU will have access to all the services accessible for this DVB receiver.

If there are no available receivers, then a STU may have access to all the services currently viewed by the other STUs and more specifically to all the services offered on the transponder that comprises the services currently viewed by said other STUs.

The Rules of sharing according to the above mentioned principles is illustrated in this example of implementation. However, it may be extended in any other Digital Home Networks of this kind that comply to the above mentioned principles and the following rules.

The allocation of the resources of the source devices which can be a DVB receiver or a Digital Storage in the home network should comply with the following five rules:

Rule 1: If a viewer is the Master of a source device, it remains the master until it releases the control of the source device. Another viewer can share this source device but as a Slave STU.

Rule 2: A Slave STU can interact with the attached source device as long as it does not interfere in the Master STU's operations. The priority is given to the Master STU so that this latter can interact with its source device even if it interferes in the operations of the attached Slave STUs.

Rule 3: If the network manager is the master of a source device, it keeps this status until it releases the source device. A STU can share the source device but as a Slave STU. A STU may request the network manager to release the control.

Rule 4: The network manager cannot have a slave status for the attached source device. If it needs an access to a source device used by a Master STU, it asks the Master STU to release the control. If this latter agrees, then the roles are swapped. Else, the network manager cancels its pending operation.

Rule 5: Once a Master STU releases the control of a source device, then a pending Slave STU automatically becomes the new Master of this source device.

Figure 3A:
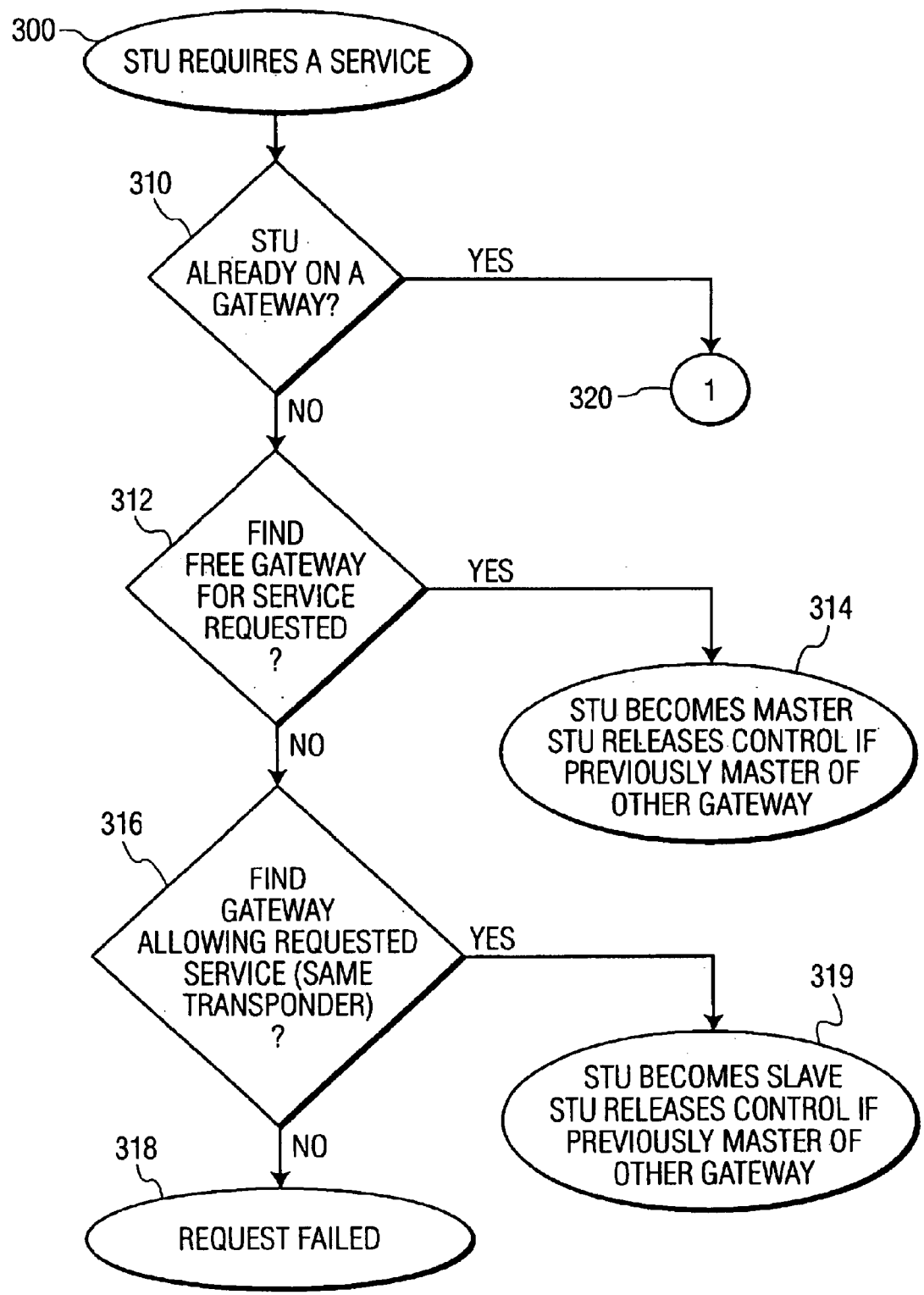
FIGS. 3A, 3B and 3C illustrate a block diagram of the Master/Slave configuration according to the present invention when a set top unit requires a service.
Figure 3B:
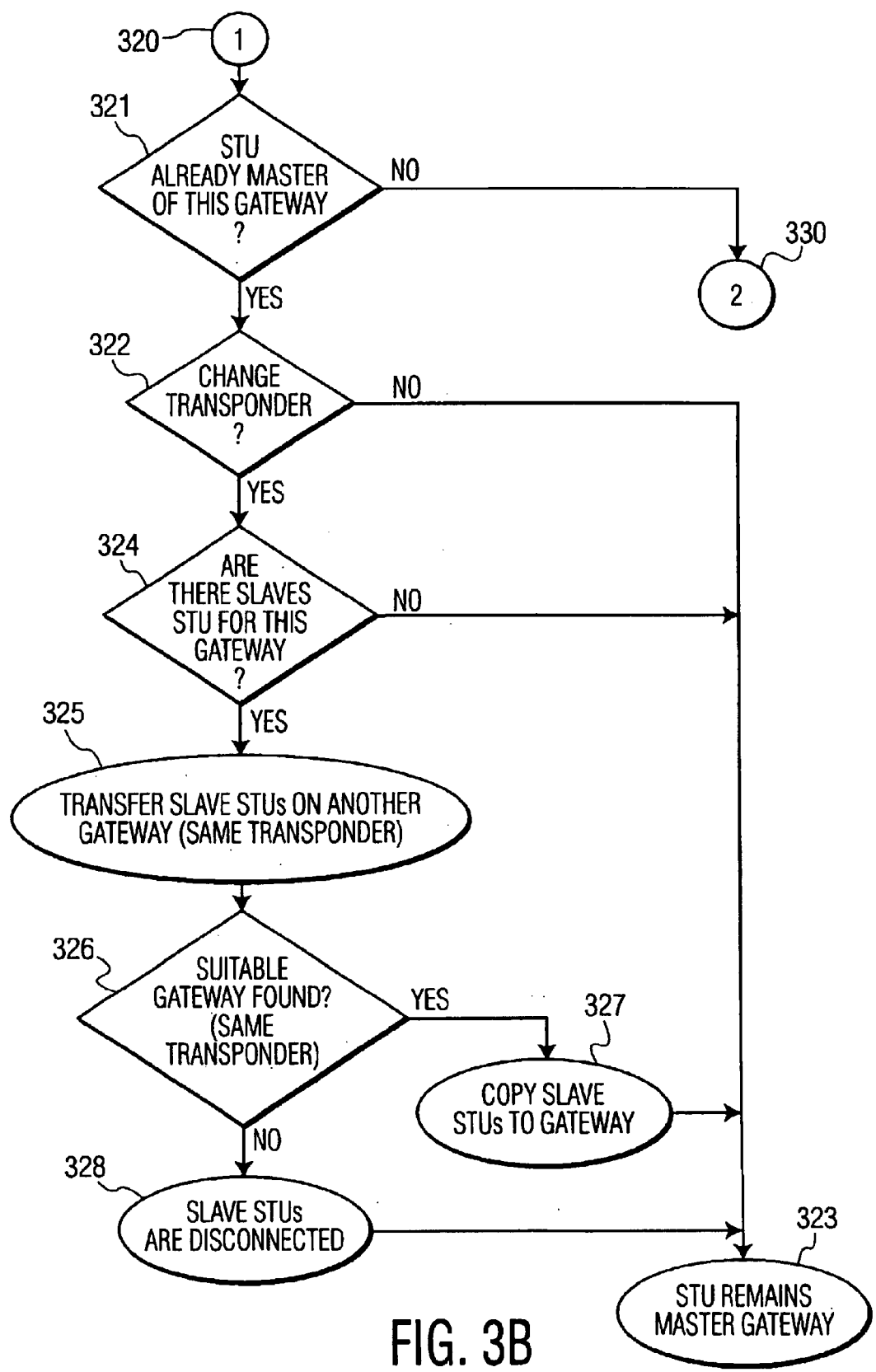
Figure 3C:
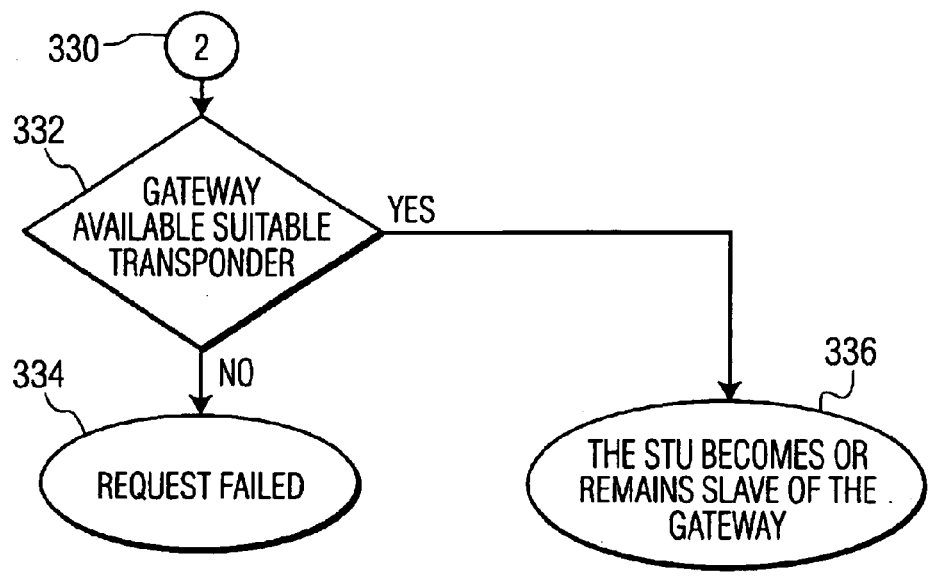

FIGS. 3A, 3B and 3C illustrate an algorithm of the Master/Slave configuration according to the present invention when a set top unit requires a service from the home network.

More particularly, FIG. 3A shows the steps that are executed by a program that is internal to the STU when a viewer of the STU requests a service on its screen at step (300). At step (310), the program tests if the STU is already connected to a Gateway that can provide the requested service. If the answer is yes, the program skips to step (320). Otherwise, an available Gateway in the home network has to be searched for, at step (312).

If an available Gateway is detected, the STU is connected to it and the STU becomes the Master of this Gateway at step (314). In case the STU is currently a Master of another Gateway, it releases the control of the latter.

Otherwise, the program will seek for a Gateway that can provide the requested service, at step (316). The service is to be on a transponder that provides a service currently viewed by an attached Master STU.

Should the occasion arises, the STU becomes a Slave STU of the detected Gateway that provides the requested service. Henceforth, if the STU is the Master of another Gateway, it has to release the control of that Gateway, at step (319). In such case, the requested service is provided to the STU, but this latter cannot control the attached Gateway since it has a Slave status. And the program ends. Otherwise, the request is considered as failed at step (318), and the program ends.

FIG. 3B resumes to step (320) which results from the fact that the service requested by the STU is already on the Gateway to which it is connected. Thus, it is necessary to detect whether the STU is the Master of the Gateway, at step (321). If it is not the case, the program skips to step (330). Otherwise, it is necessary to determine if the transponder has to be changed in order to provide the requested service at step (322).

If the transponder must not to be changed, the STU remains the Master of the Gateway, at step (323), and the program ends. Otherwise, the program should determine at step (324) if there are Slave STUs that are connected to this Gateway. If no Slave STU is connected to this Gateway, the program loops to step (323). Otherwise, at step (325), the Slave STUs connected to this Gateway are to be transferred to another Gateway with the same provider and on the same transponder.

Afterwards, at step (326), the program checks to detect if there is another Gateway in the home network that provides the services used by the Slave STUs. Should the occasion arise, the Slave STUs are copied to the detected Gateway at step (327). Then, the programs jumps to step (323) where it ends. Otherwise, the Slave STUs are simply disconnected at step (328) and the program jumps to step (323).

FIG. 3C resumes to step (330) which results from the fact that the service requested by the STU is already on the Gateway to which it is connected, but unfortunately it is not the Master of the Gateway. Therefore, the program has to determine if the Gateway is available with the suitable transponder at step (332).

If the Gateway with the suitable transponder is not available, the request is considered as failed, at step (334). Otherwise, the service is provided to the STU but this latter becomes or remains the Slave of the Gateway, at step (336).

Figure 4:
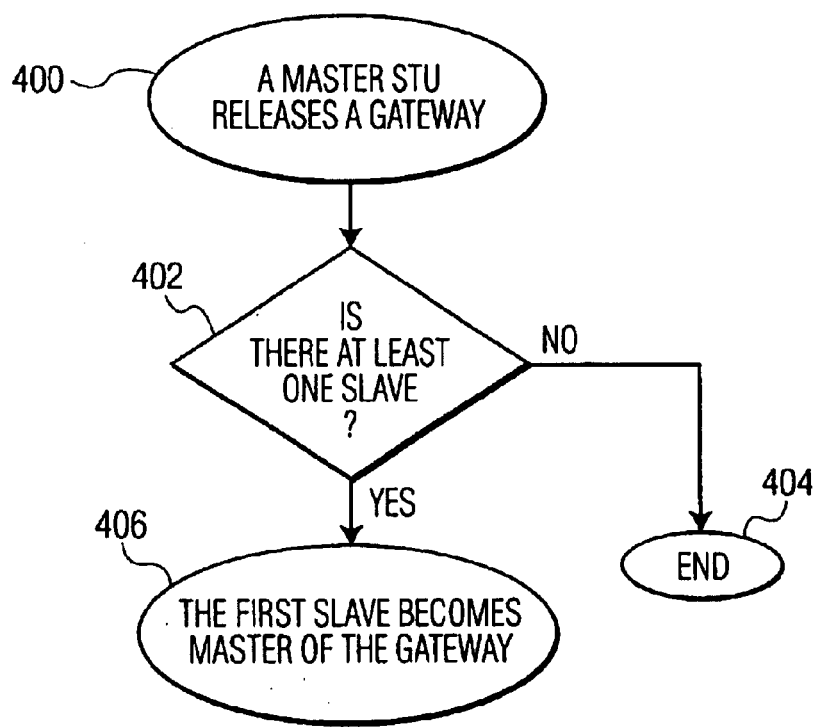
FIG. 4 illustrates a block diagram of the Master/Slave configuration according to the present invention when a Master STU releases a receiver.

FIG. 4 illustrates a block diagram of the Master/Slave configuration according to the present invention when a Master STU releases a Gateway. If such case occurs, it is required to detect if a Slave STU is connected to the Gateway, at step (402).

If no Slave STU is detected, no further action is required. The Gateway is disconnected and the program ends at step (404). Otherwise, at step (406), a Slave STU that is first on the waiting list becomes the Master STU of the released Gateway.

Figure 5:
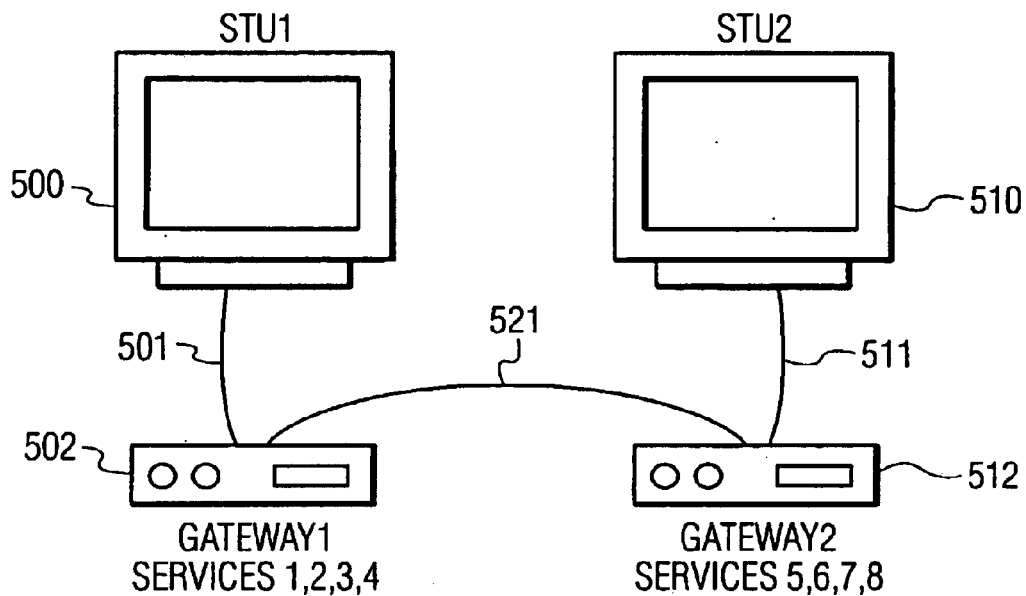
FIG. 5 illustrates an example of the home network configuration that comprises two STUs and two Gateways.

In order to give a better illustration of this Master/Slave configuration in a Digital Home Network according to the present invention, an example of the preferred embodiment is shown in FIG. 5. Another STU may be added to this network as well without requiring great modifications in the description that follows.

Let us consider a Digital Home Network composed of two STUs, STU1 (500) and STU2 (510), and two Gateways, Gateway1 (502) and Gateway2 (512). Both STUs are respectively connected to the Gateways by links (501) and (511), and the Gateways are connected to each other by bus (521).

Figure 6:
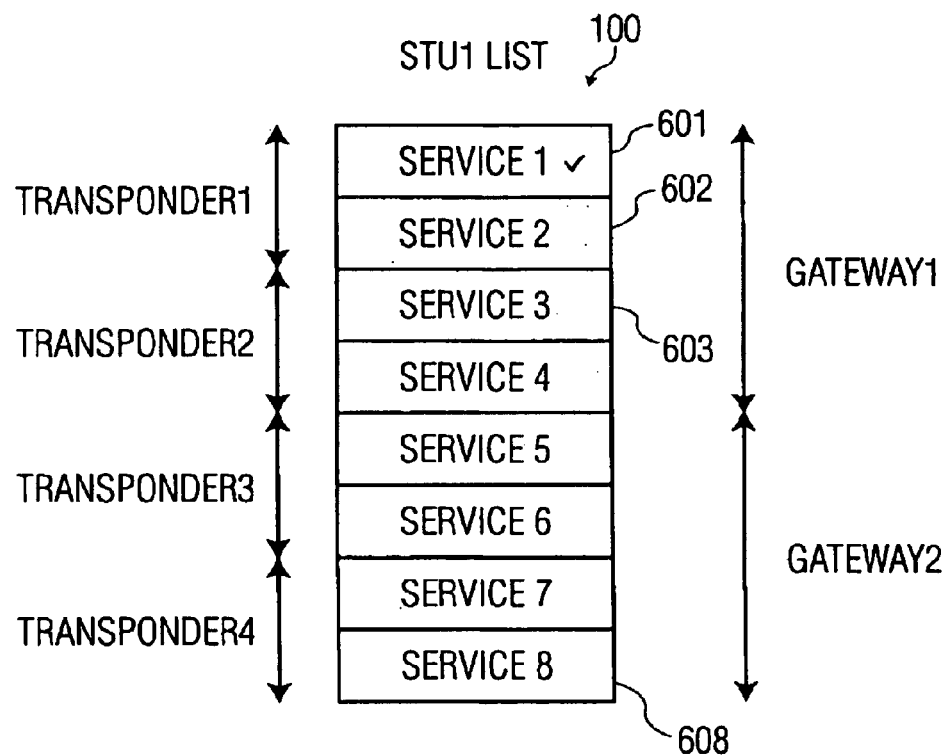
FIG. 6 shows the content of a STU's seamless list when this latter is the first to be connected to a receiver of the home network.

By referring to FIG. 6, Gateway1 offers four services:
Service1 (601) and Service2 (602) on Transponder T1,
Service3 (603) and Service4 on Transponder T2.

Conversely, Gateway2 offers four services:
Service5 and Service6 on Transponder T3,
Service7 and Service8 (608) on Transponder T4.

Each STU has a seamless list which can be retrieved on a screen showing the services that it can have access as a Master STU or as a Slave STU according to principles and the rules previously mentioned. In the preferred embodiment, STU1 (500) and STU2 (510) have respectively their corresponding seamless lists (100) and (200).

In this particular implementation, the services are provided by a satellite emitter, but the case of services provided by a cable emitter or a terrestrial emitter can be replaced easily without substantial amendments. The principles remain the same.

FIG. 6 shows the case when STU1 (500) wishes to receive Service1 (601) provided on Transponder T1 of Gateway1 (502) whereas STU2 (510) remains idle or is not receiving any service provided on the present home network. Since STU1 is the first STU to be connected to this Gateway1, it becomes the Master of Gateway1. Therefore, it can switch on whichever service provided by Gateway1 as a Master STU. Conversely, since no STU is connected to Gateway2, neither as a Slave STU nor a Master STU, the services that are provided by Gateway2 can be viewed by STU1, or any other STU as well.

Therefore, STU1's seamless list (100) shows all the services that can be provided by both Gateway1 (502) and Gateway2 (512). In an alternative preferred embodiment, STU1's seamless list represents Service1 with a particular sign so as to indicate that Service1 is currently viewed by STU1. In the list shown in FIG. 6, Service1 has a special indication such a tick.

FIGS. 7A and 7B shows the status of STU1's and STU2's seamless lists when a further event takes place wherein STU2 (510) wishes to receive Service2 provided on transponder T1 of Gateway1 (502).

STU1's seamless list (100) remains the same as the one of FIG. 6. As STU1 is already viewing a service of Gateway1, STU2 can be connected to Gateway1 only as a Slave STU. Since Service3 and Service4 are not provided on the same transponder that are being currently used by the Master STU1 (500), they cannot be accessed by STU2. Therefore, Service3 and Service4 are not shown in STU2's seamless list. However, Services 5 to 8 can be accessed by any STU, since Gateway2 (512) is not currently used by any STU yet. Thus, STU2's seamless list (200) only contains Service1 (711), Service2 (712), Service5 (713), Service6, Service7 and Service8 (716).

It should also be noted that Service1 (711) and Service2 (712) of STU2's seamless list have a grey background, meaning that these services can be accessed by STU2 but as a Slave STU. Indeed, if STU2 is viewing Service1 or Service2, it can be disconnected if STU1 is switching from a service of transponder1 for selecting a service provided on another transponder of Gateway1, for instance Service3 and Service4 of transponder T2.

The next event that can be considered is shown in FIGS. 8A and 8B wherein STU2 (510) wishes to receive Service7. In such case, STU2 becomes Master of Gateway2 (512). Its seamless list (200) does not change. However, in a preferred embodiment, the seamless list would have grey backgrounds for Service1 (811) and Service2 (812) and with a special indication for Service7 (815) such as a tick.

Concerning STU1's seamless list, Service5 and Service6 are not displayed since STU1 cannot have access to these services. Indeed, Service5 and Service6 are not provided on the same transponder that are being currently viewed by the Master STU2 (510). However, Service7 and Service8 (806) can be accessed by STU1, but as Slave STU only. It should also be noticed that Service7 and Service8 (806) would have preferably grey backgrounds. Since STU1 is currently viewing Service1, a special indication is shown, such as a tick.

Figure 9B:
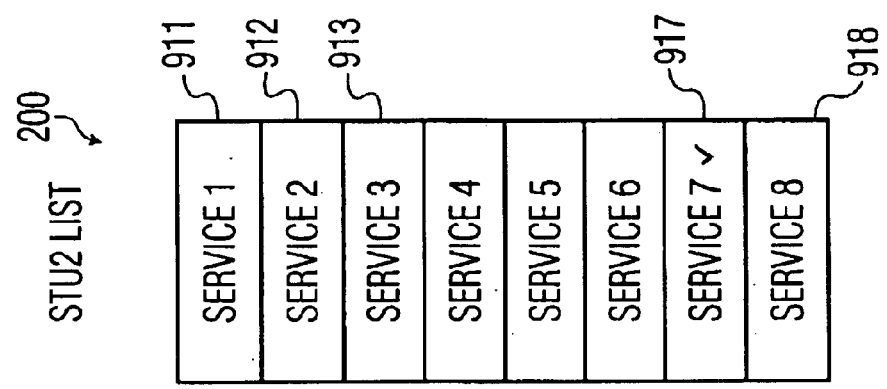
FIGS. 9A and 9B illustrate the content of both STUs' seamless lists when both STUs are switching on the same transponder of a receiver.
Figure 9A:
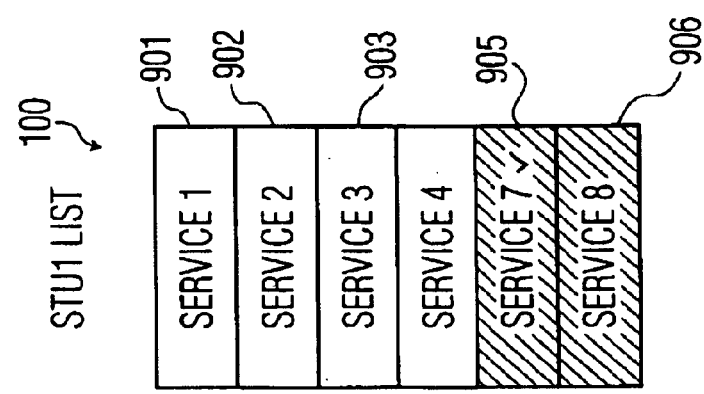

Let us consider in FIGS. 9A and 9B that STU1 wishes to view a service that is provided on the same transponder as the one currently used by another STU on another Gateway. According to this particular example, these latter are STU2 and Gateway2, and this requested service is for instance Service7.

Henceforth, all services of Gateway1 (512) can be accessed by both STUs. Thus, Service1 (901), Service2 (902), Service3 (903) and Service4 are shown in STU1's seamless list (100). These four services are also provided in the STU2's seamless list (200).

However, concerning the services provided by Gateway2, STU1 can only have access to Service7 (905) and Service8 (906), which are shown in STU1's seamless list; whereas STU2 can additionally have access to Service5 and Service6. Therefore, STU2's seamless list shows all the services of both Gateways.

In a preferred embodiment, Service7 and Service8 that are represented in STU1's seamless list have grey backgrounds so as to indicate that STU1 may have access to both services only as a Slave STU. Since STU1 is viewing Service7, this latter bear a special indication which is for instance a tick. Conversely, in STU2's seamless list, Service7 also has the tick indication.

Figure 10:
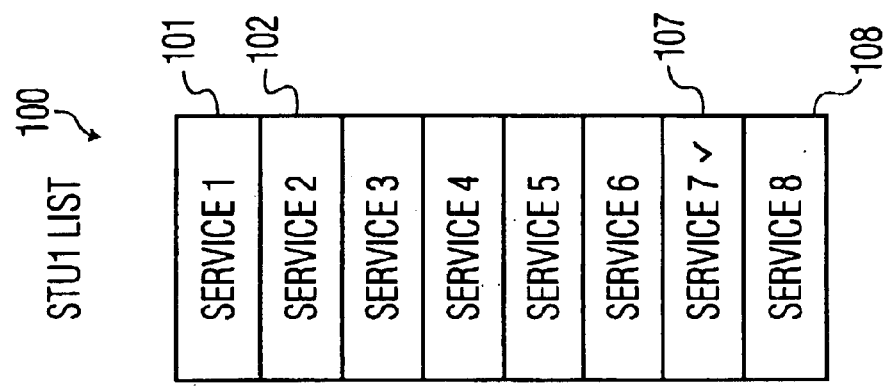
FIG. 10 illustrates the content of a STU's seamless list of the currently connected STU when the other STU is disconnected from the home network.

And finally, FIG. 10 shows the case when STU2 (510) disconnects from the home network. Thus, STU1 (500) is now the only set top unit on the network. It becomes the Master of Gateway2 (512).

STU1's seamless list (100) now contains all the services provided by Gateways that are available in the home network. Service1, Service2, Service3, Service4, Service5, Service6, Service7 and Service8 are represented in the list. STU1 may connect to any of them as a Master STU. It should therefore noticed that there is no grey background for the services provided. However, the tick that is used for showing which service is currently be viewed by STU1 is indicated in Service7 (107).

It should be noted that if STU1 is disconnected from the home network, the same result is obtained. STU2's seamless list would be identical to STU1's seamless list and STU2 would have exactly the same opportunities in the home network.

Furthermore, it should also be kept in mind that the different cases previously described can be considered in a different chronological order. For instance the case of FIGS. 8A and 8B might occur before the case of FIGS. 7A and 7B.

The implementation of seamless lists enable an STU to control and to track the services tuned by a specific STU by displaying the seamless list of this latter. This ability can be allowed to a predetermined STU which is for instance the STU dedicated to the parents or any responsible person of the home network.

Additionally, it must be acknowledged that the present invention may be implemented in a network computer.

What is claimed is:

1. A method for sharing a resource of a plurality of receivers for receiving video/audio/data services broadcasted by at least an emitter among a plurality of video, audio and/or data processing devices in a home network comprising:
   (a) assigning to each of said processing devices connected to said home network, one of said plurality of receivers providing requested resource that is available, by conferring to each said processing device a status of Master processing device;
   (b) assigning to each newly connected processing device one of said plurality of receivers providing requested resource by conferring a status of Slave processing device, when no receiver providing requested resource is available; and
   (c) sharing the resource between Master processing devices and Slave processing devices in said home network so as to provide access to said requested resource for said Slave processing devices
   (d) conferring the status of Master processing device until this device releases its control; and
   (e) releasing the control of a receiver when no further service from said receiver is requested.

2. The method of claim 1 wherein said resource contains a plurality of services that are provided by one of a plurality of digital transport streams of said at least one emitter.

3. The method according to claim 2 wherein said step (a) further comprises:
   requesting a service from said home network;
   responsive to said request from a processing device, determining if said processing device is already connected to a receiver so as to determine its status;
   if said processing device has a Slave status, determining if said service can be retrieved from the transport stream currently received by a corresponding Master processing device so as to discard said service request or to keep the status of Slave processing device unchanged;
   if said processing device has a Master status, determining if said transport stream needs to be changed so as to keep the Master status of said processing device and to retrieve said requested service; and
   if said processing device is not already connected to a receiver,
   finding an available receiver to assign it to said processing device; or
   finding a receiver that can share the transport stream of said requested service so as to assign the Slave status to said processing device, otherwise discarding said service request.

4. The method according to claim 3 further comprising the step of assigning to each processing device a corresponding control means for displaying graphically available resource.

5. The method according to claim 4 further comprising the step of designating in said control means an indication of Slave status for resource that can be provided for the corresponding processing device.

6. The method according to claim 5 further comprising the step of designating in said control means a special indication of resource currently used by a corresponding processing device.

7. The method according to claim 4 further comprising the step of designating in said control means a special indication of resource currently used by a corresponding processing device.

8. The method of claim 1 further comprising:
   (e') releasing the control of a receiver in response to a release request of a network manager so as to become a Slave processing device and to enable said network manager to become a Master processing device of said receiver.

9. The method according to claim 8 wherein said step (a) further comprises:

requesting a service from said home network;

responsive to said request from a processing device, determining if said processing device is already connected to a receiver so as to determine its status;

if said processing device has a Slave status, determining if said service can be retrieved from the transport stream currently received by a corresponding Master processing device so as to discard said service request or to keep the status of Slave processing device unchanged;

if said processing device has a Master status, determining if said transport stream needs to be changed so as to keep the Master status of said processing device and to retrieve said requested service; and if said processing device is not already connected to a receiver, finding an available receiver to assign it to said processing device; or finding a receiver that can share the transport stream of said requested service so as to assign the Slave status to said processing device, otherwise discarding said service request.

10. The method according to claim 9 further comprising the step of assigning to each processing device a corresponding control means for displaying graphically available resource.

11. The method according to claim 10 further comprising the step of designating in said control means an indication of Slave status for resource that can be provided for the corresponding processing device.

12. An apparatus for sharing a resource of a plurality of means for receiving video/audio/data services broadcasted by at least an emitter among a plurality of video, audio and/or data processing devices in a home network comprising:

means for assigning to each of said processing devices connected to said home network, one of said plurality of receivers providing requested resource that is available by conferring to each said processing device a status of Master processing device;

means for assigning to each newly connected processing device one of said plurality of receivers providing requested resource by conferring a status of Slave processing device, when no receiver providing requested resource is available; and means for sharing the resource between Master processing devices and Slave processing devices in said home network so as to provide access to said requested resource for said Slave processing devices;

means for conferring the status of Master processing device until this device releases its control; and means for releasing the control of a receiver when no further service from said receiver is requested.

13. The apparatus of claim 12 further comprising control means for each processing device for displaying graphically resource that is available for said corresponding processing device wherein said control means contains:

an indication of Slave status for resource that can be provided for the corresponding processing device; and/or a special indication for resource that is currently used by a corresponding processing device.

14. The apparatus according to claim 13 to be implemented in a digital network computer.

15. The apparatus according to claim 12 to be implemented in a digital network computer.

16. A method for sharing a resource of a plurality of receivers for receiving video/audio/data signals broadcasted by at least an emitter among a plurality of video, audio and/or data processing devices in a home network, each receiver operable for providing a transport stream containing at least one service for broadcast onto the home network, the method comprising:

assigning to each of said processing devices connected to said home network, one of said plurality of receivers providing requested resource that is available, by conferring to each said processing device a status of Master processing device, and assigning to each newly connected processing device one of said plurality of receivers providing requested resource by conferring a status of Slave processing device, when no receiver providing requested resource is available;

requesting a service from said home network;

responsive to said request from one of said processing devices, determining if said processing device is already connected to a receiver so as to determine its status;

if said processing device has a Slave status, determining if said service can be retrieved from the transport stream currently received by a corresponding Master processing device so as to discard said service request or to keep the status of Slave processing device unchanged;

if said processing device has a Master status, determining if said transport stream needs to be changed so as to keep the Master status of said processing device and to retrieve said requested service; and if said processing device is not already connected to a receiver, finding an available receiver to assign to said processing device; or finding a receiver that can share the transport stream of said requested service so as to assign the Slave status to said processing device, otherwise discarding said service request.

* * * * *

UNITED STATES PATENT AND TRADEMARK OFFICE
CERTIFICATE OF CORRECTION

PATENT NO. : 6,762,690 B1
DATED : July 13, 2004
INVENTOR(S) : Eric Diehl and Joel Sirot It is certified that error appears in the above-identified patent and that said Letters Patent is hereby corrected as shown below:

<u>Title page,</u>
Item [56], References Cited, U.S. PATENT DOCUMENTS, please add the following:

| | | | | |
|---|---|---|---|---|
| -- | 5,748,732 | 5/1988 | Le Berre et al. | 380/10 |
| | 5,784,683 | 7/1998 | Sistanizadeh et al. | 455/5.1 |
| | 5,828,403 | 10/1998 | DeRodeff et al. | 348/7 |
| | 5,883,677 | 3/1999 | Hofmann | 548/384 |
| | 5,936,660 | 8/1999 | Gurantz | 348/10 |
| | 5,940,387 | 8/1999 | Humpleman | 370/352 |
| | 6,055,560 | 4/2000 | Millis et al. | 709/200 |
| | 6,085,236 | 7/2000 | Lea | 709/220 |
| | 6,160,989 | 12/2000 | Hendricks, et al. | 455/4.2 |
| | 6,177,963 | 1/2001 | Foye et al. | 348/706 |
| | 6,237,049 | 5/2001 | Ludtke | 710/8 |
| | 6,317,884 | 11/2001 | Eames et al. | 725/78 |
| | 6,092,214 | 7/2000 | Quoc et al. | 714/4 -- |

Signed and Sealed this

Eighteenth Day of January, 2005

JON W. DUDAS
*Director of the United States Patent and Trademark Office*